US010686392B2

(12) United States Patent
Wang

(10) Patent No.: US 10,686,392 B2
(45) Date of Patent: Jun. 16, 2020

(54) DRIVING PERMANENT MAGNET MOTOR BASED ON NEUTRAL POINT VOLTAGE

(71) Applicant: STMICROELECTRONICS (BEIJING) R&D CO. LTD, Beijing (CN)

(72) Inventor: Rendong Wang, Beijing (CN)

(73) Assignee: STMICROELECTRONICS (BEIJING) R&D CO. LTD., Beijing (CN)

( * ) Notice: Subject to any disclaimer, the term of this patent is extended or adjusted under 35 U.S.C. 154(b) by 0 days.

(21) Appl. No.: 16/259,533

(22) Filed: Jan. 28, 2019

(65) Prior Publication Data

US 2019/0238078 A1  Aug. 1, 2019

Related U.S. Application Data

(60) Provisional application No. 62/624,526, filed on Jan. 31, 2018.

(51) Int. Cl.
| | |
|---|---|
| G01R 31/02 | (2006.01) |
| H02P 21/18 | (2016.01) |
| H02K 11/33 | (2016.01) |
| H02K 11/21 | (2016.01) |
| H02K 11/27 | (2016.01) |
| H02K 1/27 | (2006.01) |
| H02P 21/22 | (2016.01) |
| H02P 21/32 | (2016.01) |
| H02K 11/26 | (2016.01) |
| H02K 21/14 | (2006.01) |

(52) U.S. Cl.
CPC .............. *H02P 21/18* (2016.02); *H02K 1/27* (2013.01); *H02K 11/21* (2016.01); *H02K 11/26* (2016.01); *H02K 11/27* (2016.01); *H02K 11/33* (2016.01); *H02K 21/14* (2013.01); *H02P 21/22* (2016.02); *H02P 21/32* (2016.02); *H02P 2209/01* (2013.01); *H02P 2209/11* (2013.01)

(58) Field of Classification Search
CPC .......... H02P 21/22; H02P 21/26; H02P 21/32; H02P 2209/01; H02K 11/33
See application file for complete search history.

(56) References Cited

U.S. PATENT DOCUMENTS

2007/0164691 A1* 7/2007 MacKay ................... H02P 6/18
318/1

* cited by examiner

*Primary Examiner* — Karen Masih
(74) *Attorney, Agent, or Firm* — Seed IP Law Group LLP

(57) ABSTRACT

The present disclosure is directed to a permanent magnet motor control method and system. A new structure configuration of a permanent magnet motor has a rotor with two or more permanent magnets attached thereon, a stator wound in a "Y" topology with three coils (windings) arranged at 120 degree among one another, and a neutral point of the wound stator wired in a manner that the voltage at the neutral point may be detected in substantially real time. The detected neutral point voltages are analyzed together with the associated vectors of the excitation current provided to the windings of the stator to determine a speed of the rotor. The determined speed of the rotor is used for vector control.

20 Claims, 12 Drawing Sheets

| Vector | $u_{A-GND}$ | $u_{B-GND}$ | $u_{C-GND}$ | | $u_{N-GND}$ |
|---|---|---|---|---|---|
| V1 | $V_{BUS}$ | $0_{BUS}$ | 0 | $V_{1N}$ | $\dfrac{V_{BUS} Z_B Z_C}{Z_A Z_B + Z_B Z_C + Z_C Z_A}$ |
| V2 | $V_{BUS}$ | $V_{BUS}$ | 0 | $V_{2N}$ | $\dfrac{V_{BUS}(Z_B Z_C + Z_C Z_A)}{Z_A Z_B + Z_B Z_C + Z_C Z_A}$ |
| V3 | 0 | $V_{BUS}$ | 0 | $V_{3N}$ | $\dfrac{V_{BUS} Z_C Z_A}{Z_A Z_B + Z_B Z_C + Z_C Z_A}$ |
| V4 | 0 | $V_{BUS}$ | $V_{BUS}$ | $V_{4N}$ | $\dfrac{V_{BUS}(Z_C Z_A + Z_A Z_B)}{Z_A Z_B + Z_B Z_C + Z_C Z_A}$ |
| V5 | 0 | 0 | $V_{BUS}$ | $V_{5N}$ | $\dfrac{V_{BUS} Z_A Z_B}{Z_A Z_B + Z_B Z_C + Z_C Z_A}$ |
| V6 | $V_{BUS}$ | 0 | $V_{BUS}$ | $V_{6N}$ | $\dfrac{V_{BUS}(Z_B Z_C + Z_A Z_B)}{Z_A Z_B + Z_B Z_C + Z_C Z_A}$ |

*FIG. 5*

DRIVING PERMANENT MAGNET MOTOR BASED ON NEUTRAL POINT VOLTAGE

BACKGROUND

Technical Field

The present disclosure is directed to driving a permanent magnet motor.

Description of the Related Art

Permanent magnet synchronous motor (PMSM) is an AC synchronous motor whose field excitation is provided by permanent magnets rather than windings in the rotor. PMSM has a wound stator and a permanent magnet rotor assembly on the rotor. The driver circuit of PMSM is commonly controlled using field-orientated control (or vector control) approaches such that three-phase AC current of six vectors is provided to the windings of the stator to drive the rotor. Solutions have been generated to determine the rotor's orientation/position relative to the stator coils. Some solutions use sensors, e.g., Hall-effect sensors, variable reluctance (VR) wheel speed sensors, or rotary encoders, to measure the rotor's angular position. Some other solutions estimate the rotor angular position by measuring the back electromotive force (back-EMF) in the undriven coils. The determined rotor position is fed into a controller for controlling the frequency and amplitude of excitation current to the stator to maintain the rotation of the rotor having the magnet assembly.

The sensor-based solutions do not work satisfactorily in some applications. For example, in applications that require high reliability, e.g., E-bike motors, the high failure ratio of Hall-effect sensors are disadvantageous. For example, Hall-effect sensors are vulnerable to high moisture environments. Further, the additional sensors bring about elevated costs.

Conventional sensorless solutions also have some drawbacks. Since back-EMF is zero at standstill and proportional to the rotor speed, the measured terminal voltage cannot detect zero crossing at low speeds. For such low speed situations, namely the rotor is stationary or at very low speed, e.g., smaller than 60 rpm, approaches have already been adopted to detect the inductance that varies with the rotor position, which are generally called high frequency waveform injection (HFI) solutions. However, the HFI solutions cannot detect changes in the rotary direction at low rotor speeds.

BRIEF SUMMARY

Examples of the present disclosure are directed to a permanent magnet motor control method and system. A new structure configuration of a permanent magnet motor has a neutral point of the wound stator wired in a manner that the voltage at the neutral point may be detected in substantially real time. The stator may be wound in a "Y" topology with three coils (windings) arranged at 120 electrical degree between one another. The detected voltage at the neutral point ("neutral voltage") may then be analyzed at a controller to determine a position of the rotor. The technique uses two different approaches to determine an initial position of the rotor, namely when the rotor is still, or to determine a dynamic position of the rotor, namely when the rotor rotates relative to the wound stator. The technique also determines a rotation direction or a change of rotation direction of the rotor.

For the determination of the initial rotor position, a short instance of calibration current is provided to the windings. The calibration voltage has a low magnitude such that the rotor will not be driven to move. The calibration current may have a frequency of 100 Hz and may last for 0.5 to 1 second, going through all six vectors in multiple cycles. The neutral voltages detected with each vector have a sinusoidal or sinusoidal like waveform. The three neutral voltage waveforms associated with three vectors that have 120 degree out-of-phase among one another may be selected to conduct a Clark transformation. The resulted Alpha and Beta waveforms may be used to determine the initial position of the rotor. The determined initial position of the rotor may be used for the initial vector control of the excitation current provided to the stator windings to drive the rotor.

After the rotor rotates from the initial position, the rotor position may be determined based on the time points when the rotor reaches a 30n-degree angle. Each 30n-degree angle is a physical rotor angle relative to the stator windings. A 30n-degree angle has an angle value of n times 30 degree with n being an integral. The rotor may reach a 30n-degree angle from a clock-wise direction or a counter-clockwise direction and the 30n-degree angle is defined generally to cover both scenarios. A second 30n-degree angle is next to a first 30n-degree angle in the rotor rotation direction, no matter whether the rotor rotates clockwise or counterclockwise. For example, if the first 30-degree angle is the 60 degree angle, the second 30n-degree angle is the 30 degree angle if the rotor is rotating clockwise, and the second 30n-degree angle is the 90 degree angle if the rotor is rotating counter-clockwise. Similarly, a third 30n-degree angle is the 30 degree angle next to the second 30n-degree angle, no matter the rotation direction of the rotor.

Upon detecting the rotor reaching a first 30n-degree angle and a second 30n-degree angle, a rotation speed of the rotor may be estimated based on the time interval between the rotor reaching the first 30n-degree angle and the second 30n-degree angle. The estimated speed may be used to determine a position of the rotor for the purpose of vector control.

The technique determines that the rotor reaches a 30n-degree angle based on the detected neutral voltages. Specifically, a crossing point between two neutral voltage waveforms that are 120 degree out-of-phase may be determined to estimate a time point of the rotor reaching a 30n-degree angle. Three neutral voltage waveforms associated with three excitation current vectors are selected for the crossing point detection, the three vectors being 120 degree out-of-phase from one another. The neutral voltage waveforms are generally not sinusoidal. The technique does not determine the full profile of the three neutral voltage waveforms, but focuses on determining the crossing points only. As an example, a crossing point may be determined by comparing the relative voltage magnitudes of a sequential pair of neutral voltage readings between two waveforms. For example, a sequential pair in a first waveform may include a first neutral voltage reading followed by and a second neutral voltage, both in the first waveform, and a sequential pair in a second waveform may include a third neutral voltage reading followed by and a fourth neutral voltage, both in the second waveform. The sequential pairs are within a cycle of six vectors of the excitation current. If the first neutral voltage reading is larger than the third neutral voltage reading and the second neutral voltage reading is smaller than the fourth neutral voltage reading, it may be determined that a crossing point of the first waveform and the second waveform has happened and an estimated time point for this crossing may be identified as a time point that the rotor reaches a 30n-degree angle.

BRIEF DESCRIPTION OF THE SEVERAL VIEWS OF THE DRAWINGS

In the drawings, identical reference numbers identify similar elements or acts unless the context indicates otherwise. The sizes and relative positions of elements in the drawings are not necessarily drawn to scale.

FIG. 5 illustrates a table of relationship between excitation current vectors and neutral voltages;

DETAILED DESCRIPTION

In the following description, certain specific details are set forth in order to provide a thorough understanding of various examples of the disclosure. However, one skilled in the art will understand that the disclosure may be practiced without these specific details. In other instances, well-known structures associated with electronic components and fabrication techniques have not been described in detail to avoid unnecessarily obscuring the descriptions of the examples of the present disclosure. The drawings are not necessarily drawn to scale and some features are enlarged to provide a more clear view of particular features.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second and third does not necessarily imply a ranked sense of order, but rather may only distinguish between multiple instances of an act or structure.

Reference throughout this specification to "one example" or "an example" means that a particular feature, structure or characteristic described in connection with the example is included in at least one example. Thus, the appearances of the phrases "in one example" or "in an example" in various places throughout this specification are not necessarily all referring to the same example. Furthermore, the particular features, structures, or characteristics may be combined in any suitable manner in one or more examples.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The present disclosure is generally directed to a permanent magnet motor control method and system. A permanent magnet motor may be a permanent magnet synchronous motor (PMSM) or a permanent magnet brushless DC motor (BLDC), or other motors that include a rotor with permanent magnets coupled thereto or embedded therein and wounded stator receiving AC excitation currents. Besides other structural differences, the back-EMF of a PMSM motor is normally of a SINE or SINE like waveform and the back-EMF of a BLDC motor is normally of a trapezoidal waveform. In the description herein, a PMSM motor is used as an illustrative example of a permanent magnet motor to describe the techniques. It should be appreciated that the descriptions associated with the PMSM examples may similarly apply to other types of permanent magnet motors including BLDC motors, without further innovative modifications, which are included in the disclosure.

Figure 1:
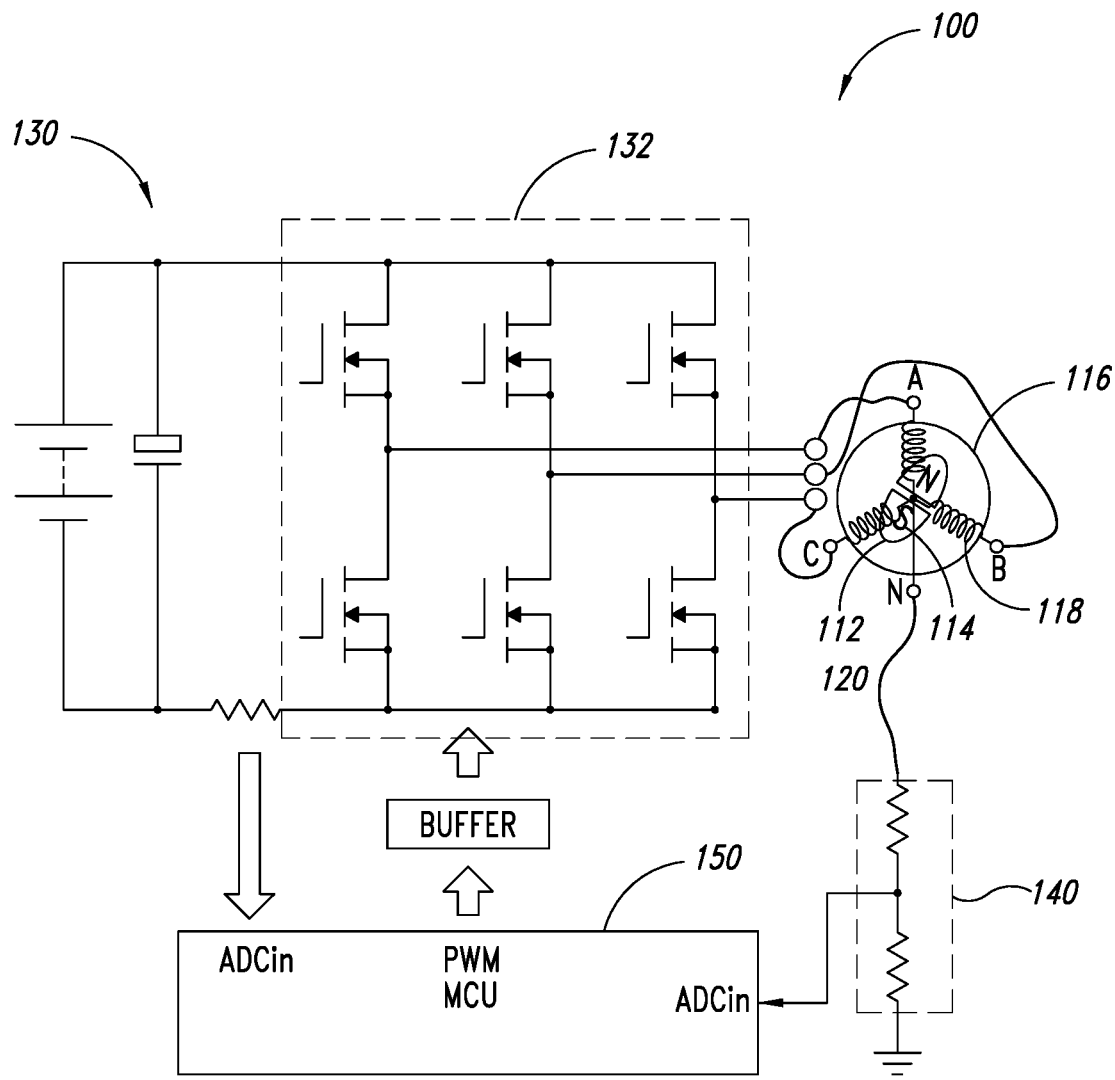
FIG. 1 illustrates an example permanent magnet motor system.

An illustrative example system 100 of controlling a PMSM motor 110 is shown in FIG. 1. PMSM motor 110 includes a rotor 112 having two or more permanent magnets 114 with "S" and "N" poles embedded thereon. Stator 116 includes three windings/windings 118 arranged in a "Y" topology with a 120 degree angle spaced among one another and a neutral point 120 of the three windings 118. A driving circuit 130 provides excitation current to windings 118 of stator 116. Neutral point 120 is coupled to a voltage detection circuit 140, shown as a voltage divider for illustrative purposes, such that the voltage at the neutral point 120, referred to herein as "neutral voltage," is detected by voltage detection circuit 140. The detected neutral voltage is fed into a controller 150 through an electrical or communicative coupling link 142. Controller 150 also receives the information of the excitation current that driving circuit 130 provides to windings 118 through an electrical or communicative coupling link 160. Driving circuit 130 includes a three-phase inverter circuit 132.

Permanent magnets 114 are rigidly fixed to the rotating axis of rotor 112. The rotor magnetic flux is constant and has a constant magnitude. When provided with an excitation current, windings 118 of stator 116 generate rotating electromagnetic fields. The interaction between the rotating electromagnetic flux of stator 116 and the constant electromagnetic flux of rotor 112 generates a torque which, when having sufficiently large magnitude, drive rotor 112 to rotate.

Controller 150 generally controls the excitation current to control the rotating magnetic field of stator 116. Specifically, controller 150 controls the driving circuit 130 to provide suitable excitation current to windings 118 so that the angle between the magnetic field of the rotating rotor 112 and the rotating magnetic field of stator 116 is relatively constant, e.g., 90 degree. The angle between the magnetic field of the rotating rotor 112 and the rotating magnetic field of stator 116 is referred to herein as the "electrical angle" of rotor 112. As such controller 150 controls the rotating frequency of the rotating magnetic field of stator 116 to be synchronized with the rotating speed of rotor 112.

Rotor 112 may include two poles, "S", "N", or more than two poles, e.g., having a toothed magnet arrangement. In the disclosure herein, rotor 112 including two poles is used as an illustrative example. It should be appreciated that the disclosure includes and readily applies to the scenario of rotor 112 including four or more poles.

Figure 2:
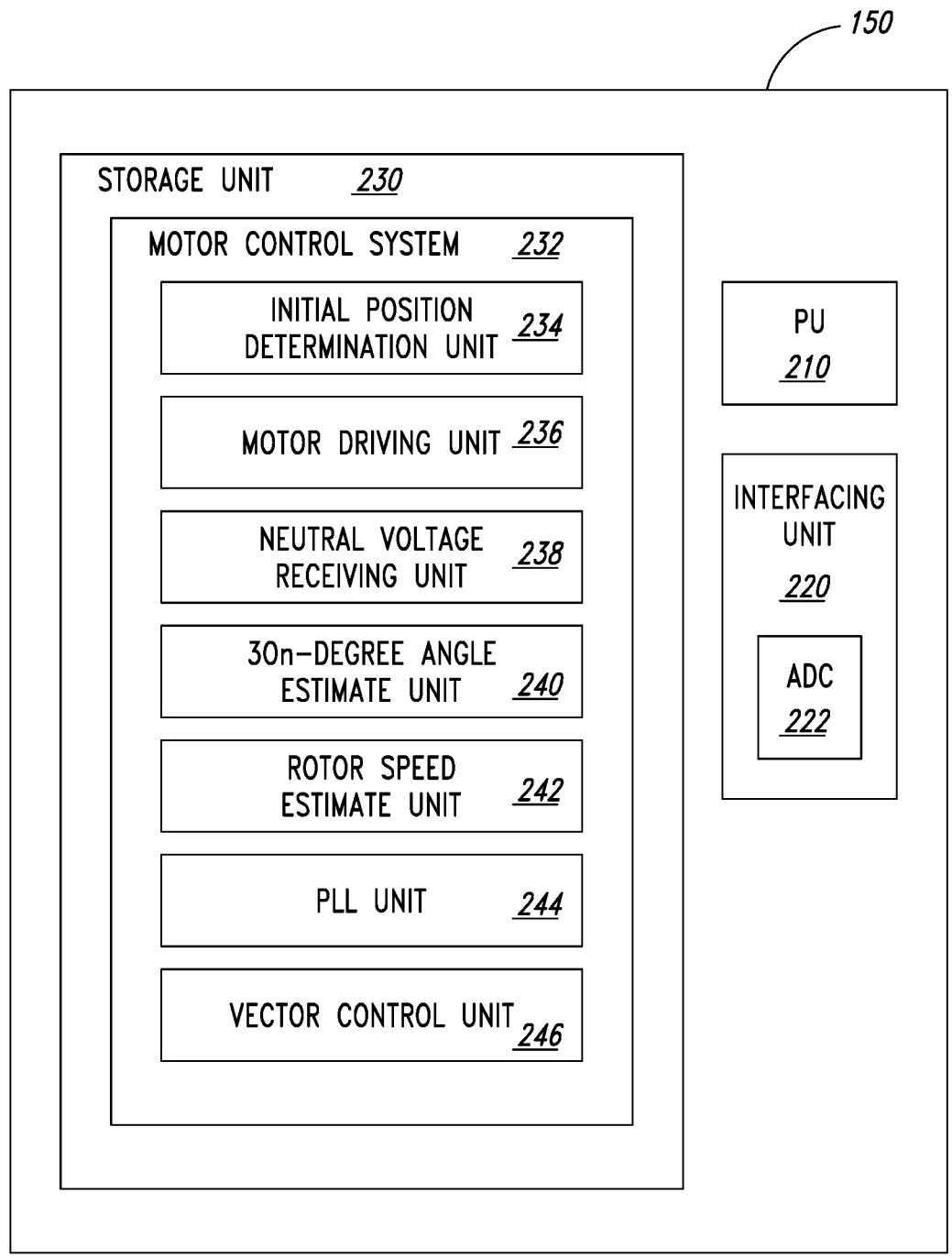
FIG. 2 illustrates an example controller of a permanent magnet motor.

Referring now to FIG. 2, controller 150 may include one or more processors 210, e.g., a processor core, an interfacing unit 220 including one or more analog digital converter (ADC) 222, and a storage unit 230 having a motor control system 232 contained therein. Motor control system 232 may include an initial position determination unit 234, a motor driving unit 236, a neutral voltage receiving unit 238, a 30n-degree angle estimation unit 240, a rotor speed estimation unit 242, a PLL unit 244, and a vector control unit 246. Motor control system 232 may be stored in one or more storage medium as software, embedded firmware, FBGA, programmable logic, a combination thereof, or other suitable storage forms.

Figure 3:
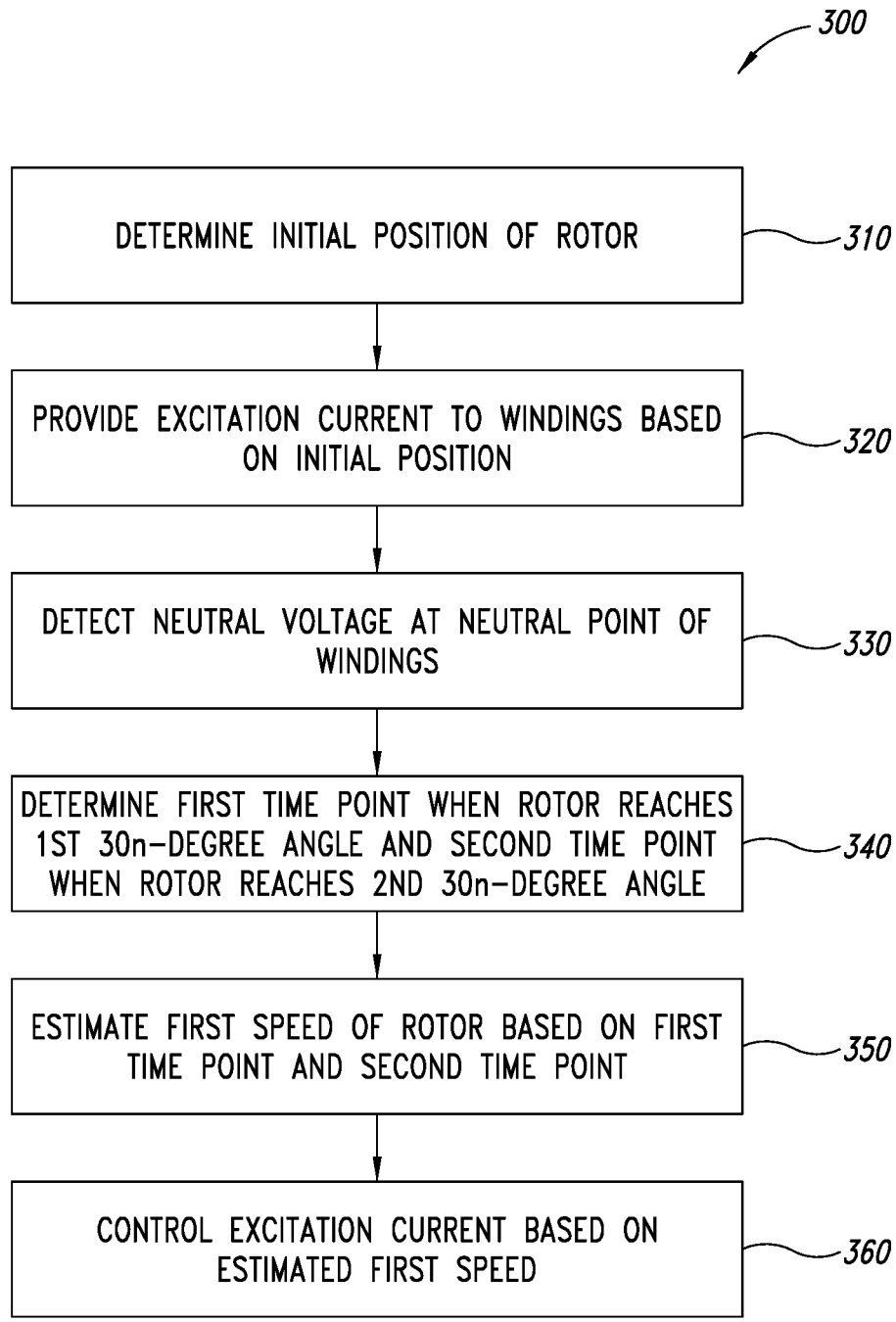
FIG. 3 illustrates an example of steps in the operation of vector controlling a permanent magnet motor.
Figure 4:
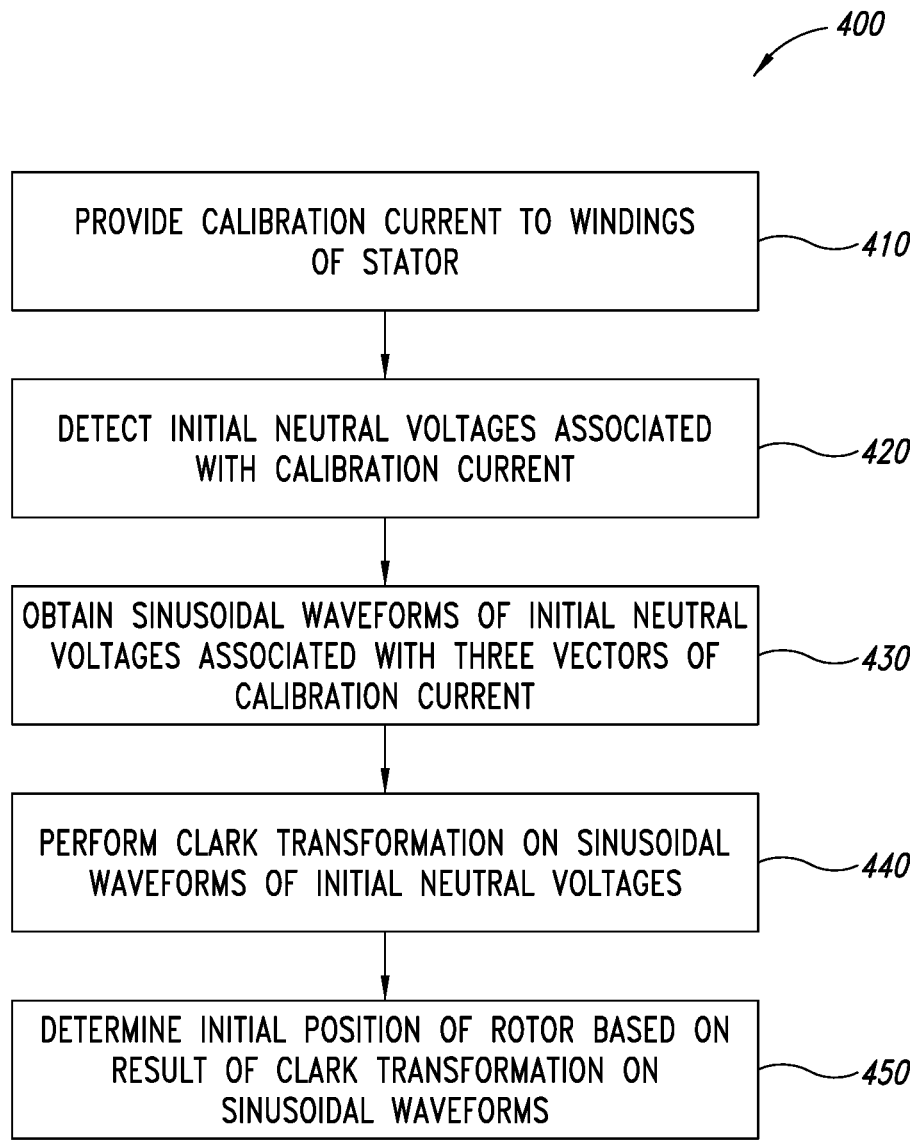
FIG. 4 illustrates an example of steps in the operation of determining an initial position of a rotor.

Referring to FIG. 3, an example vector control process 300 is shown. In example operation 310, initial position determination unit 234 determines an initial position of rotor 112. As will be appreciated, a position of rotor 112 is relative to stator 116 and is represented as a physical angle of rotor 112 relative to the stator 116. An initial position of rotor 112 refers to a position of rotor 112 when rotor 112 is in a stationary state, i.e., not rotating. Any approaches may be used to determine the initial position of rotor 112, which are all included in the disclosure. FIG. 4 shows an example process of determining the initial position of rotor 112 based on neutral voltages.

Referring to FIG. 4, in example operation 410, a calibration current is provided to windings 118. The calibration current may have a frequency of 100 Hz and may last for 0.5 to 1 second going through all six vectors of the winding 118 multiple cycles. The calibration current has a magnitude smaller than a threshold magnitude to drive rotor 112. That is, under the calibration current, rotor 112 stays stationary. When rotor 112 stays stationary, the waveforms of the neutral voltage corresponding to the vectors of the calibration current is sinusoidal or similar to sinusoidal.

It is determined that the waveforms of the neutral voltage are related to the initial position of rotor 112. FIG. 5 provides a table of neutral voltage values corresponding to each of the six vectors of the calibration current, referred to as, $v_{1n}$, $v_{2n}$, $v_{3n}$, $v_{4n}$, $V_{5n}$, $V_{6n}$. In FIG. 4, $v_{bus}$ is the voltage of the calibration current, and $Z_A$, $Z_B$, $Z_C$ are the inductances of coils A, B, C of stator windings 118, which are related to the initial position of rotor 112.

In example operation 420, with the calibration current being provided to windings 138, the neutral voltages are detected by voltage detection circuit 140, which are then fed into neutral voltage receiving unit 238 through interfacing unit 220 of controller 150.

In example operation 430, initial position determination unit 234 relates the detected neutral voltages and the corresponding vectors of the calibration current and reconstructs the waveforms of the neutral voltages corresponding to three vectors of the calibration current. The three vectors are 120 degree out-of-phase from one another.

Figure 6:
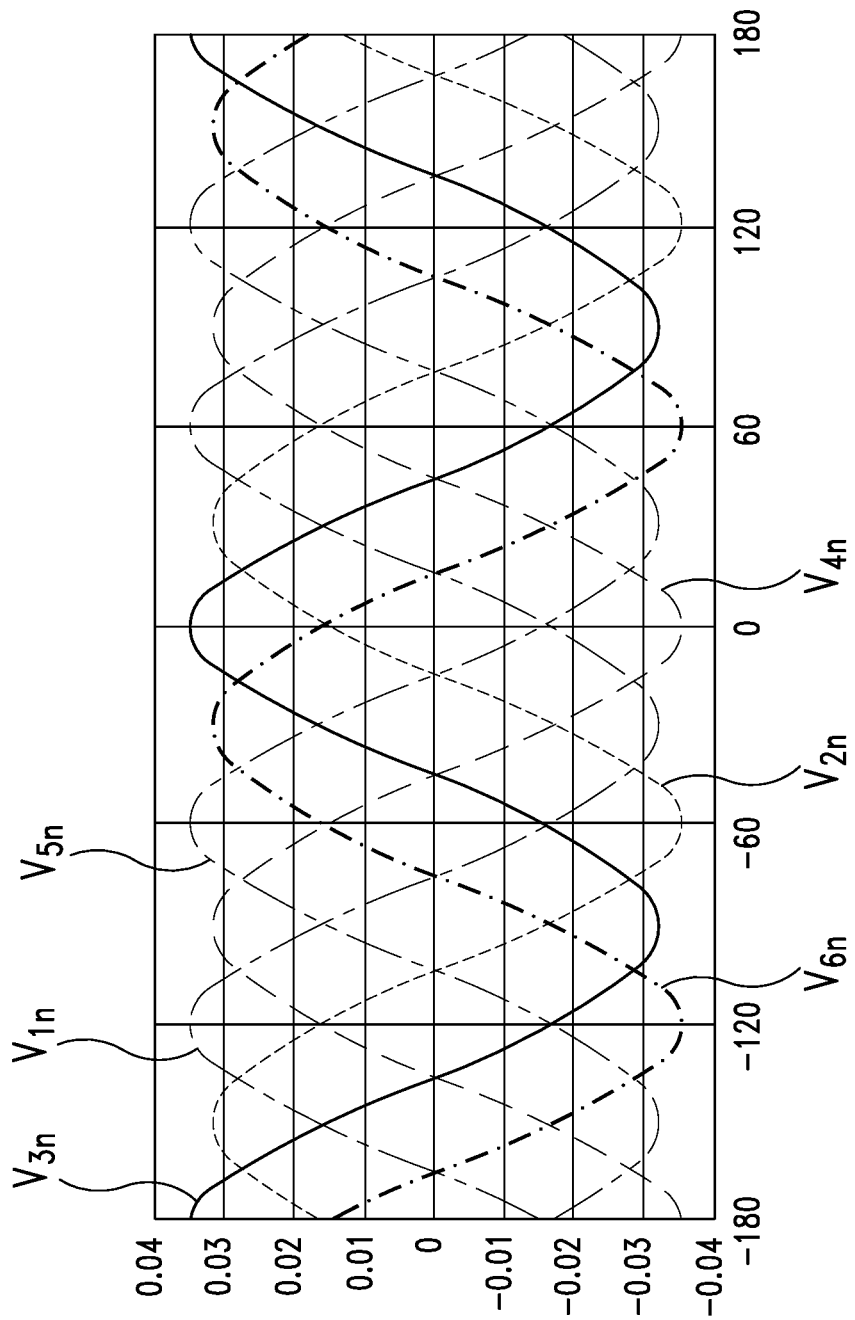
FIG. 6 illustrates example neutral voltage waveforms.

FIG. 6 shows example reconstructed waveforms of the neutral voltages $v_{1n}$, $v_{2n}$, $v_{3n}$, $v_{4n}$, $V_{5n}$, $V_{6n}$ corresponding to the six vectors of example calibration current. As shown in FIG. 6, the waveforms are sinusoidal like. Waveforms of $v_{1n}$, $v_{3n}$, $V_{5n}$ are 120 degree out-of-phase from one another and waveforms of $v_{2n}$, $v_{4n}$, $v_{6n}$ are 120 degree out-of-phase from one another.

In example operation 440, a Clark transformation is conducted on the three neutral voltage waveforms that are 120 degree out-of-phase from one another, i.e., either the cluster of $v_{1n}$, $v_{3n}$, $v_{5n}$ or the cluster of $v_{2n}$, $v_{4n}$, $V_{6n}$.

Figure 7A:
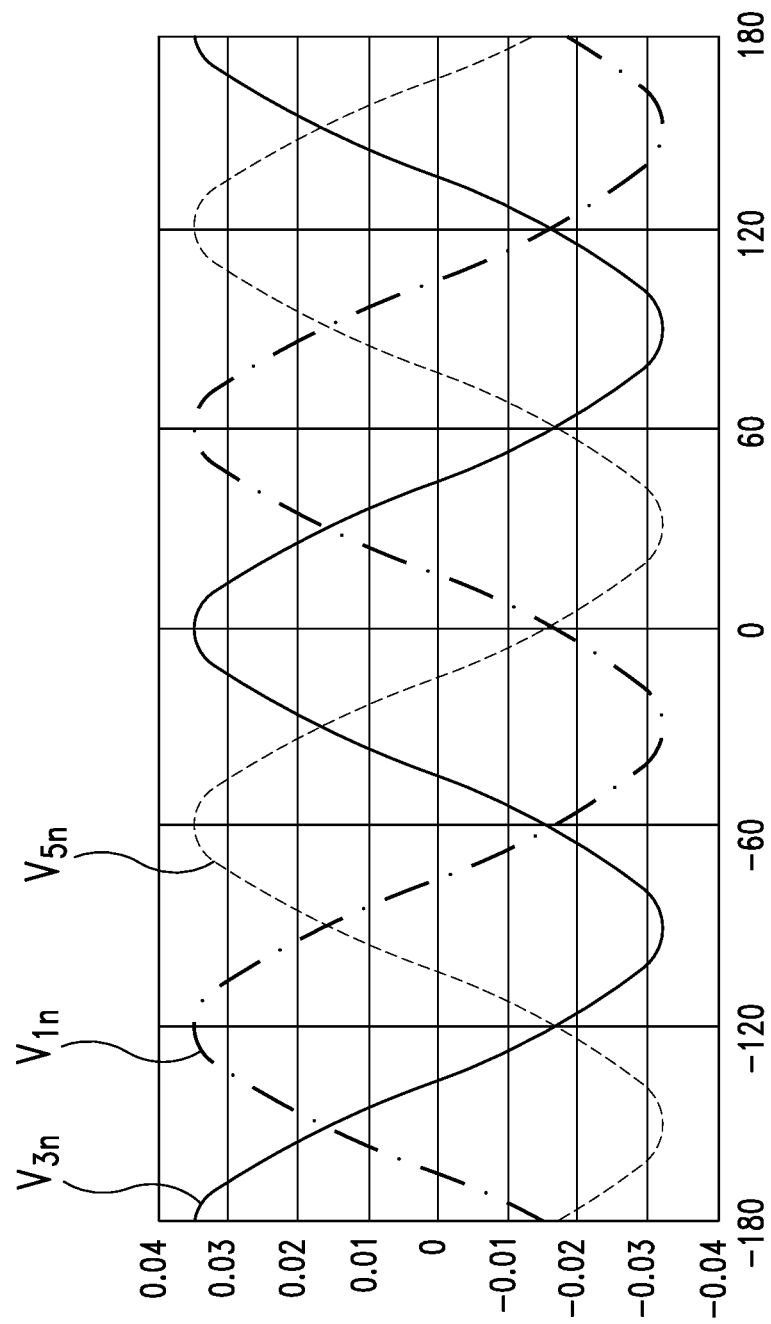
FIG. 7A illustrates three sinusoidal like neutral voltage waveforms having 120 degree out-of-phase from one another.
Figure 7B:
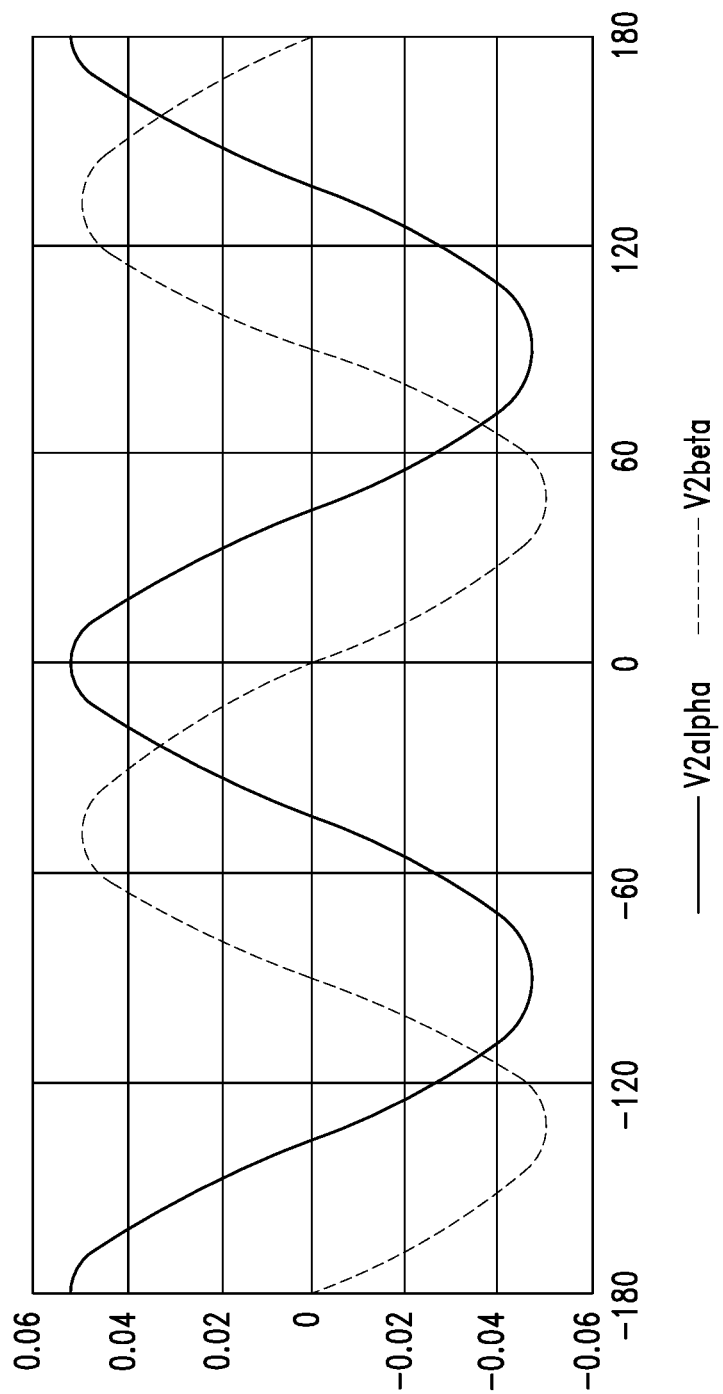
FIG. 7B illustrates a result of Clark transformation of the neutral voltage waveforms of FIG. 7A.

FIG. 7A shows the waveforms of neutral voltages $v_{1n}$, $v_{3n}$, $v_{5n}$ that are 120 degree out-of-phase from one another. FIG. 7B shows example alpha and beta waveforms $V2_{alpha}$ and $V2_{beta}$ obtained from the Clark transformation.

In example operation 450, the initial rotor position is determined based on the results of the Clark transformation. With the alpha and beta waveforms available, the initial position of rotor 112 can be obtained using the below algorithm (1):

$$\tan(2\theta d) = \frac{V2beta}{V2alpha}, \quad (1)$$

where, $\theta_d$ is rotor position, i.e., the physical angle of rotor 112 relative to stator 116.

It should be appreciated that the initial position of rotor 112 may be determined using other approaches, which are also included in the disclosure.

Referring back to FIG. 3, in example operation 320, motor driving unit 360 causes driving circuit 130 to provide excitation current to windings 118 to drive rotor 112 based on the initial position of rotor 112. For example, motor driving unit 360 may use the initial rotor 112 position information to generate vector control signals to the three-phase inverter circuit 132 of driving circuit 130 to generate excitation current to windings 118.

As will be appreciated, the electrical angle between the magnetic field of rotating rotor 112 and rotating magnetic field of stator 116 must be continually and dynamically controlled to produce maximum torque and achieve high electro-mechanical conversion efficiency. For this purpose, controller 150 estimates a rotation speed of rotor 112, referred to herein as "speed," based on the detected neutral voltages at neutral point 120 and conducts vector control of the excitation current to windings 118 based on the estimated speed of rotor 112. The estimated rotation speed of rotor 112 will be further adjusted in the course of the rotor 112 rotation.

In example operation 330, voltage detection circuit 140 detects the neutral voltages at neutral point 120 with rotor 112 rotating. The detected neutral voltages are received by neutral voltage receiving unit 238 through interfacing unit 220. The received neutral voltage information is associated with the corresponding vector information of the excitation current provided by driving circuit 130. The vector information may be directly retrieved from controller 150 or may be received from driving circuit 130 or a combination thereof. Note that, a neutral voltage is generated based on an excitation current having a specific vector, namely "the associated vector."

In example operation 340, 30n-degree angle estimation unit 240 determines a time point when rotor 112 reaches a 30n-degree angle. For example, 30n-degree angle estimation unit 240 determines each time point when rotor 112 reaches a 30n-degree angle. A 30n-degree angle is a physical angle of rotor 112 and has a value of n times 30 degrees, where n is an integral and could be positive, negative or zero. As normally appreciated, a negative angle of rotor 112 indicates that rotor 112 rotates in a clockwise direction and a positive angle indicates that rotor 112 rotates in a counter-clockwise direction.

As appreciated, rotor 112 may change the rotation direction during its operation. For example, when rotor 112 rotates in a counter-clockwise direction, it may reach 60 degree angle (a 30n-degree angle) from 30 degree angle (a 30n-degree angle). If rotor 112 then changes rotation direction and rotate in a clockwise direction, it may then reach 30 degree angle (−330 degree) from 60 degree angle (−300 angle).

According to an embodiment, when determining the time point that a 30n-degree angle is reached by rotor 112, 30n-degree angle estimation unit 240 does not take into consideration the rotation direction of rotor 112. There is a separate operation that determines the rotation direction as discussed herein.

According to an embodiment, neutral voltages are detected and used to determine that a 30n-degree angle is reached by rotor 112. It is noticed by the disclosure that rotor 112 reaching a 30n-degree angle coincidently with two neutral voltage waveforms of 120 degree out-of-phase crossing over one another. Note that each neutral voltage waveform corresponds to a vector of the excitation current provided to windings 118. It is also noticed by the disclosure that when rotor 112 is excited to rotate and function with loads, the waveforms of the neutral voltages are generally not sinusoidal. As such, it is not satisfactorily accurate if the crossing points between two neutral voltage waveforms are determined based on assumed sinusoidal waveforms.

Figure 8A:
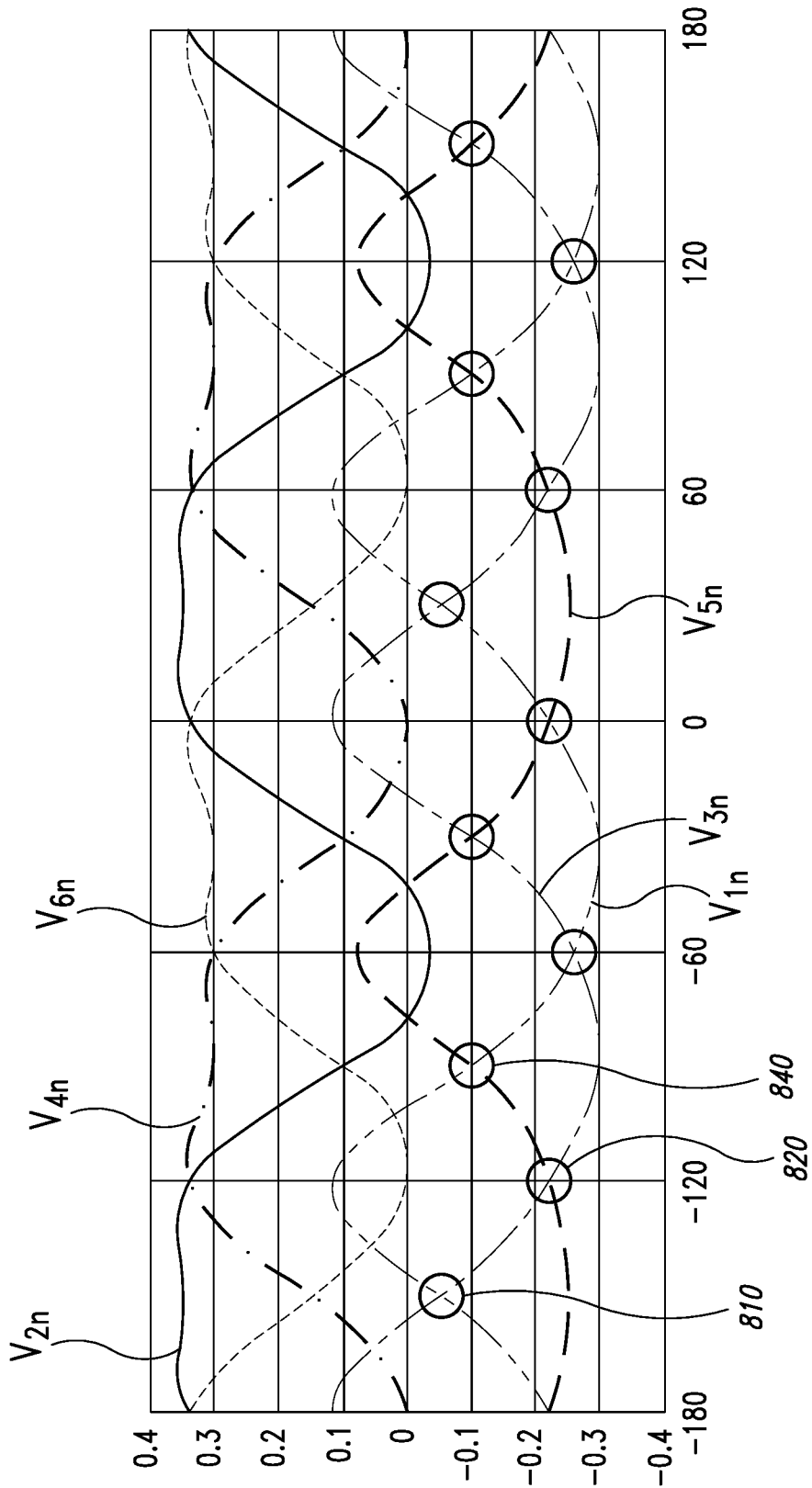
FIG. 8A illustrates crossing-points on neutral voltage waveforms of rotor rotating in a first direction.
Figure 8B:
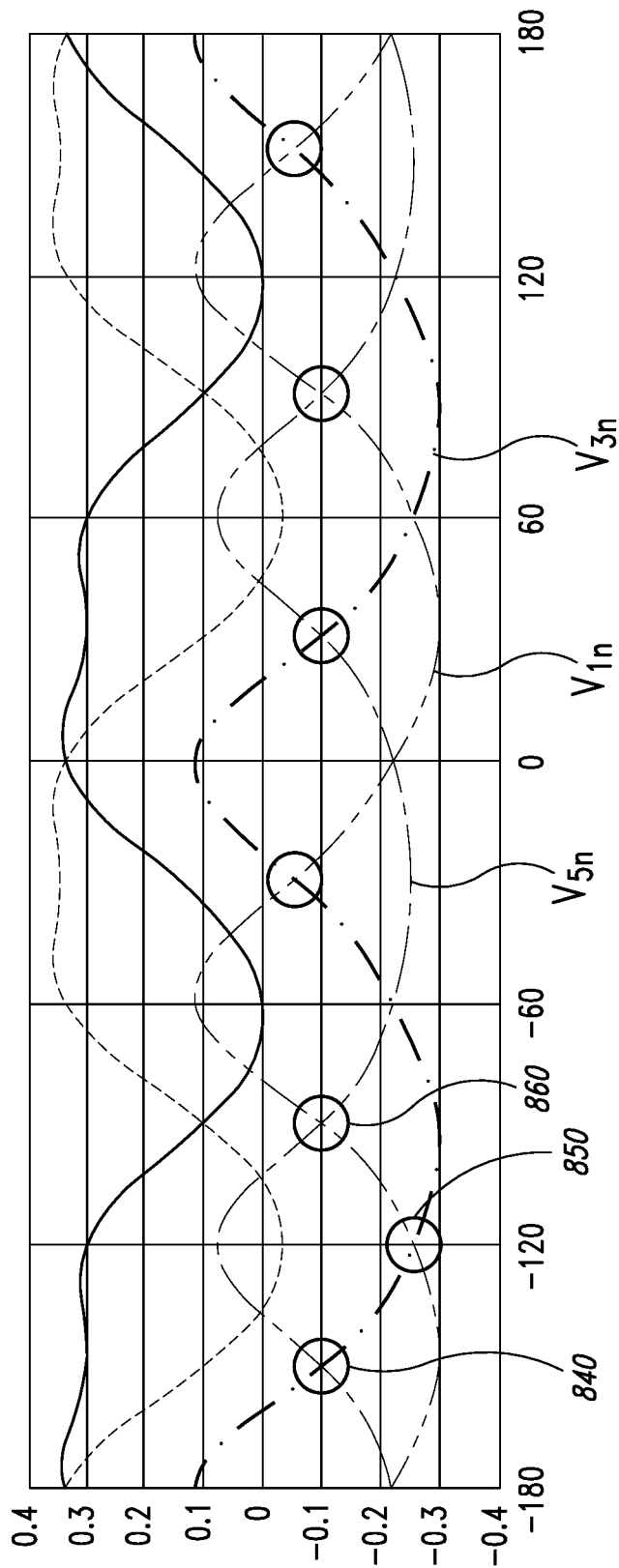
FIG. 8B illustrates crossing-points on neutral voltage waveforms of rotor rotating in a second direction.

FIGS. 8A and 8B show crossing points among neutral voltage waveforms $v_{1n}$, $V_{3n}$, and $V_{5n}$. As shown in FIG. 8A, for example, the crossing points 810, 820 and 830 correspond to 30n-degree angles of −150 degree, −120 degree and −90 degree.

Figure 9:
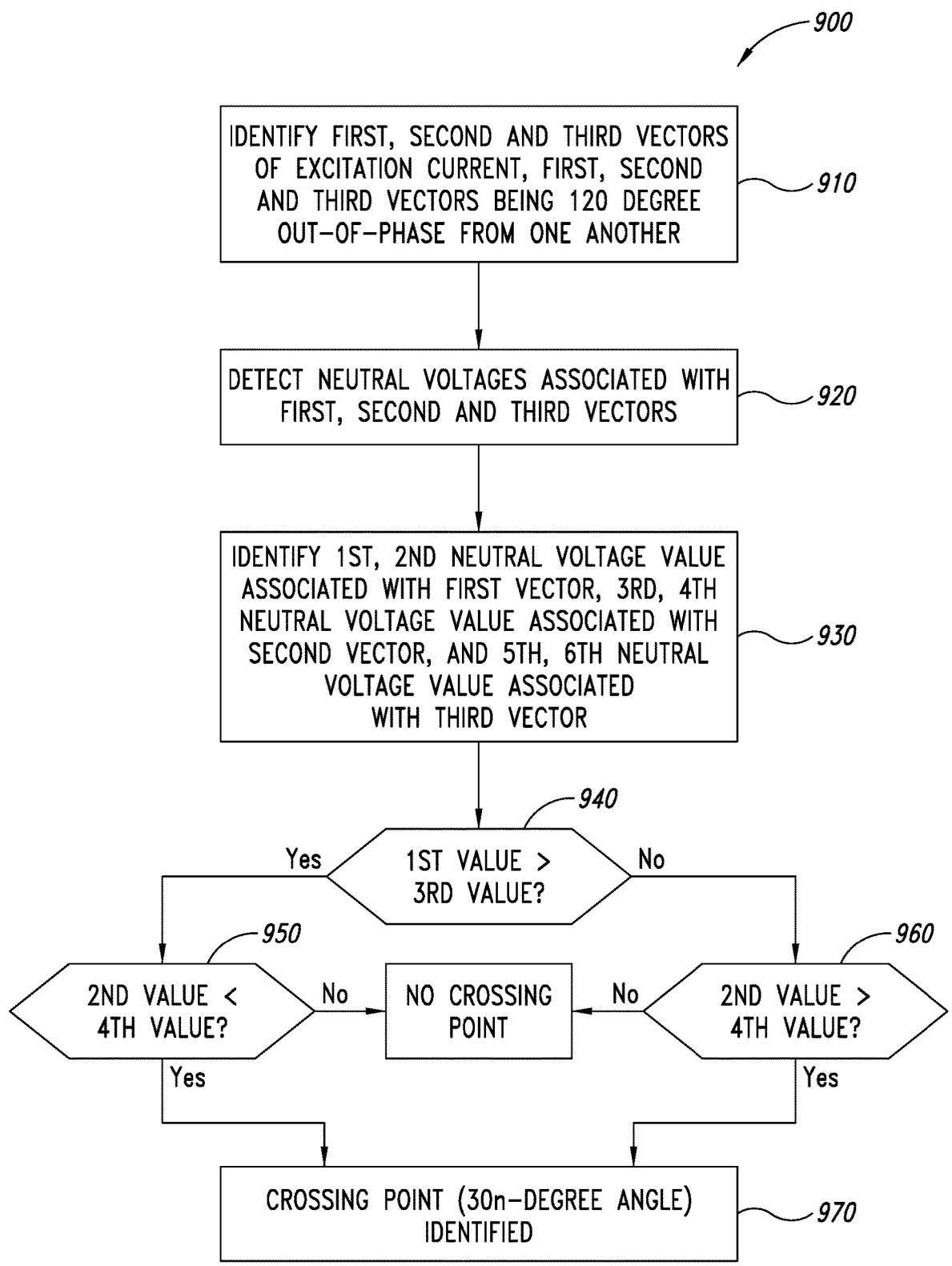
FIG. 9 illustrates an example process of determining a crossing point.

FIG. 9 shows an example process 900 to determine a crossing point between two neutral voltage waveforms. Referring to FIG. 9, in example operation 910, first, second and third vectors of excitation current are identified, which are 120 degree out-of-phase from one another. In the description herein, for illustrative purposes, assuming that vectors $V_1$, $V_3$ and $V_5$ are selected (FIG. 3). It will be appreciated that vectors $V_1$, $V_3$ and $V_5$ are 120 degree out-of-phase from one another.

In example operation 920, the neutral voltages associated with the selected vectors are detected. For example, $v_{1n}$, $v_{3n}$ and $v_{5n}$ are associated with vectors $V_1$, $V_3$ and $V_5$ and are detected through voltage detection circuit 140 and received by neutral voltage receiving unit 238.

In example operation 930, two immediately sequential voltage values ("sequential pair") are identified in each neutral voltage waveform (actual waveform not needed) of $v_{1n}$, $v_{3n}$ and $v_{5n}$ associated with the vectors $V_1$, $V_3$ and $V_5$. That is, a first neutral voltage value and a second, later neutral voltage value in $v_{1n}$ associated with vector $V_1$, a third neutral voltage value and a fourth, later neutral voltage value in $V_{3n}$ associated with vector $V_3$, and a fifth neutral voltage value and a sixth, later neutral voltage value in $v_{5n}$ associated with vector $V_5$ are identified. These sequential pairs of neutral voltage values are within a cycle of vector rotation, namely within six vectors of excitation current.

Then, the sequential pairs of neutral voltage values in each vector are compared one-to-one in the sequential order to that of another vector to determine a crossing point.

With vectors $V_1$, $V_3$ shown as illustrative examples, in example operation 930, the first neutral voltage value of $v_{1n}$ is compared with the third neutral voltage value of $v_{3n}$ and the second neutral voltage value of $v_{1n}$ is compared with the fourth neutral voltage value of $v_{3n}$. If the first neutral voltage value of $v_{1n}$ is larger than the third neutral voltage value of $v_{3n}$, in example operation 940, and if then the second neutral voltage value of $v_{1n}$ is smaller than the fourth neutral voltage value of $v_{3n}$ in 950, it is determined that a crossing point happens. Similarly, if the first neutral voltage value of $v_{1n}$ is smaller than the third neutral voltage value of $v_{3n}$, in 940, and in example operation 960, and the second neutral voltage value of $v_{1n}$ is larger than the fourth neutral voltage value of $v_{3n}$, it is determined that a crossing point happens.

With a crossing-point determined under this approach, a time point of the crossing-point can also be estimated based on the time points of the relevant sequential neutral voltages. For example, if it is determined that a crossing-point happens between neutral voltage waveforms $v_{1n}$, $v_{3n}$, a time point of the crossing-point may be estimated based on the time points of the sequential pair of the first neutral voltage value and second neutral voltage value of $v_{1n}$, the time points of the sequential pair of the third neutral voltage value and the fourth neutral voltage value of $v_{3n}$, or a combination thereof. Note that a crossing-point indicates that a 30n-degree angle is reached by rotor 112.

Following this procedure, 30n-degree angle estimation unit 240 determines a time point of each 30n-degree angle reached by rotor 112.

Referring back to FIG. 3, in example operation 350, rotor speed estimation unit 242 estimates a first speed of rotor 112 based on a first time point of rotor 112 reaching a first 30n-degree angle and a second time point of rotor 112 reaching a second next 30n-degree angle. For example, in the case of assumed constant rotation speed, the rotor speed may be determined as:

$$\omega = \frac{d\theta}{dt}, \qquad (2)$$

where ω indicates constant or average angular speed, dθ indicates change in rotor angles, here 30 degree, and dt indicates the time interval between the first time point and the second time point. It should be appreciated that algorithm (2) is provided for illustrative purpose only and is not limiting. The first time point and the second time point of rotor 112 reaching a first 30n-degree angle and a second next 30n-degree angle may also be used to determine an acceleration of rotor 112 during the time interval, which is also part of the first speed of rotor 112.

In example operation 360, vector control unit 246 controls the excitation current to windings 118 based on the estimated rotor speed using conventional vector control approaches. For example, the controlling the excitation current includes estimating a dynamic position of rotor 112 based on the estimated speed. The speed could include a constant speed and could include an acceleration/deceleration rate of rotor 112. With the dynamic positions of rotor 112 determined, the vectors of the excitation current may be determined accordingly, as appreciated under conventional vector control solutions.

With respect to detailed implementation of the speed estimation, rotor speed estimation unit 242 may further adjust the determined rotor speed based on a cross-check operation on historical speed estimation, by PLL unit 244. As appreciated, the rotor speed determined under algorithm (2) above is retrospective, referred to herein as "retrospective speed estimation" for descriptive purposes. That is, rotor 112 has already passed both the first 30n-degree angle and the second 30n-degree angle, when algorithm (2) is used to calculate the speed. When driving rotor 112 to rotate from the first 30n-degree angle to the second 30n-degree angle, a speed has already been estimated and used for the vector control purposes, as will be appreciated, which is herein referred to as a "prospective speed estimation" for descriptive purposes. The retrospective speed estimation and the prospective speed estimation may be compared by PLL unit 244 to determine a calibration value, which reflects an accuracy of the prospective speed estimation. The calibration value may be used to calibrate or fine-tune the current retrospective speed estimation so that a new prospective speed estimation is obtained for vector control purposes.

Figure 10:
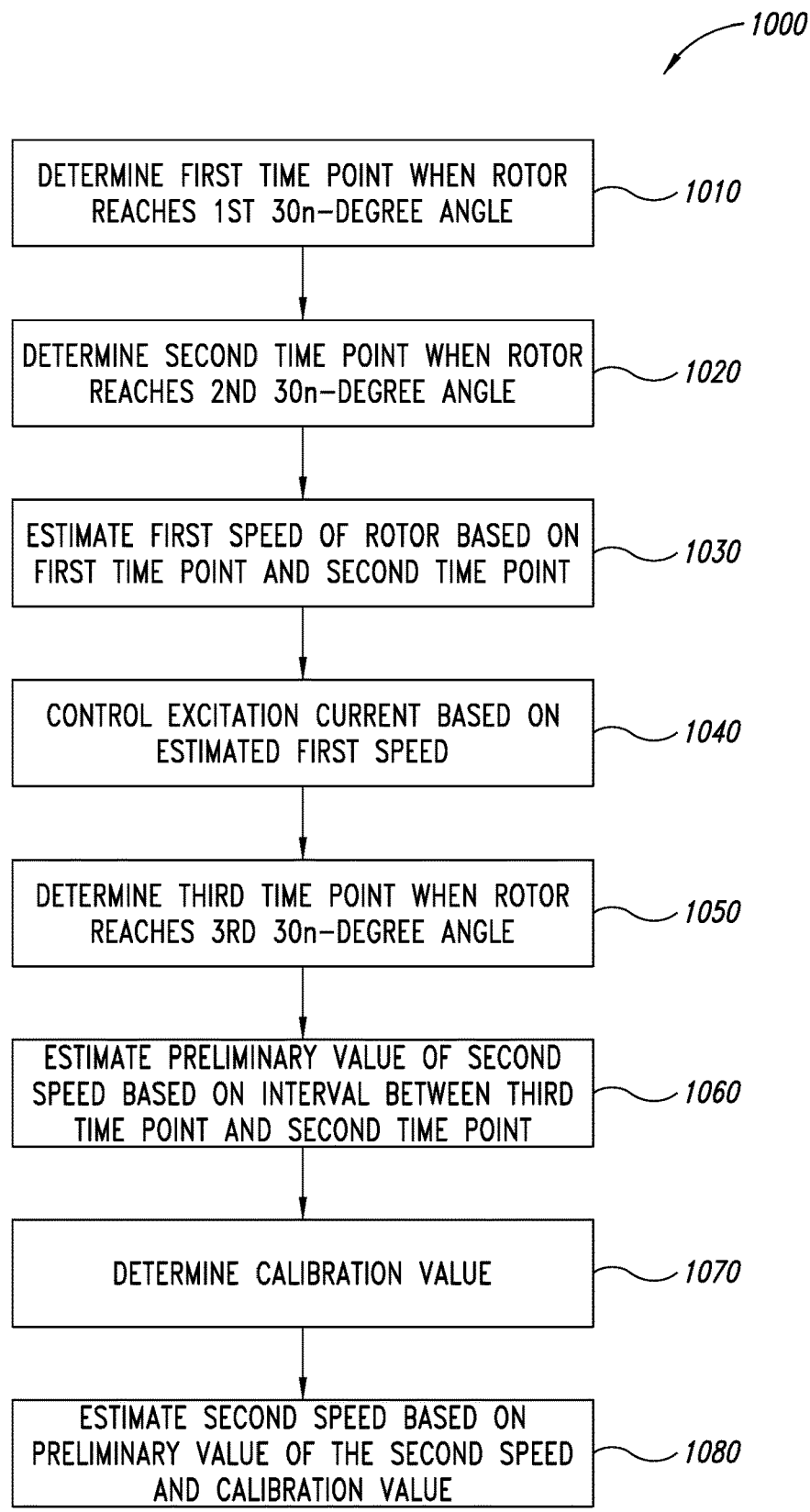
FIG. 10 illustrates an example process of determining a rotor speed.

FIG. 10 illustrates an example operation of speed estimation calibration. In example operation 1010, a first time point is determined when rotor 112 reaches a first 30n-degree angle.

In example operation 1020, a second time point is determined when rotor 112 reaches a second 30n-degree angle.

In example operation 1030, a first speed is estimated based on the first time point and the second time point. The estimation of the first speed may include a calibration operation which is not detailed herein for simplicity purposes.

In example operation 1040, the first speed is used as a prospective speed to control the vectors of the excitation current provided to windings 118 to drive rotor 112.

In example operation 1050, a third time point is determined when rotor 112 reaches a third 30n-degree angle, under vector control based on the first speed.

In example operation 1060, a preliminary value of a second speed is estimated based on the time interval between the third time point and the second time point, e.g., using algorithm (2).

In example operation 1070, a calibration value is determined by at least one of comparing the preliminary value of the second speed with the first speed or comparing the third time point with a comparison time point. The comparison time point is a time point when rotor 112 is supposed to reach the third 30n-degree angle under the first speed (prospective speed estimation).

In example operation 1080, a second speed of rotor 112 is estimated based on the preliminary value of the second speed and the calibration value. For example, the second speed may be determined using the below algorithm:

$$\omega_2 = \omega_{2p} + \omega_{2p} * \frac{\omega 2p - \omega 1}{\omega 1}, \quad (3)$$

where, $\omega_2$ is the second speed, $\omega_1$ is the first speed, and $\omega_{2p}$ is the preliminary value of the second speed.

For another example, a proportional-integral-derivative (PID) control may be used in determining the second speed. Specifically, for example, the second speed may be determined using the below algorithm:

$$\omega_2 = \omega_{2p} + (\theta_{30N} - \theta_N) * \text{PLL\_Gain} \quad (4),$$

where $\omega_2$ is the second speed, $\omega_{2p}$ is the preliminary value of the second speed, $\theta_{30N}$ is the 30n-degree angle, $\theta_N$ is the position of rotor estimated based on the first speed $\omega_1$ and the time interval $T_s$ for reaching the current 30n-degree angle from the previous 30n-degree angle, and where, PLL_Gain may be determined using the below:

$$\text{PLL\_Gain} = KP + KI/s \quad (5),$$

and $$KI = KP^2/(\text{damping factor})^2 * Ts \quad (6)$$

where KP is PLL bandwidth. PLL bandwidth and damping factor are constant values under specific PLL design.

In yet another example, the second speed may be determined using the below algorithm:

$$\omega_2 = \omega_{2p} + \text{PPL\_Output} \quad (7),$$

and $$\text{PLL\_Output} = KP*(\theta_{30N} - \theta_N) + KI*\Sigma_{N=0}{}^{n}(\theta 30N - \theta N) \quad (8)$$

It should be appreciated that the first speed in example algorithm (3) above could be determined under other approaches and all are included in the disclosure. For example, the first speed may be determined based on the initial position of rotor 112.

Further, the disclosure also includes determining a rotation direction of rotor 112 based on vectors of the excitation current associated with a 30n-degree angle. Specifically, each crossing points involves two vectors (i.e., crossing neutral voltage waveforms associated with two vectors) and a sequence of the crossing points may be used to determine a rotation direction of rotor 112. Referring to FIG. 8A, which shows the example neutral voltage waveforms of rotor 112 rotating in a first direction, e.g., counter-clockwise direction. For waveforms $v_{1n}$, $v_{3n}$, $v_{5n}$, the crossing points 810 ($v_{1n}$, $v_{3n}$), 820 ($v_{3n}$, $v_{5n}$), 830 ($v_{1n}$, $v_{5n}$) follow a certain fixed sequential order. As shown in FIG. 8B, when rotor 112 rotates in a second direction, e.g., clockwise direction, the sequential order of the crossing points are different. Here in FIG. 8B, shown as examples, the crossing points 840 ($v_{3n}$, $v_{5n}$), 850 ($v_{1n}$, $v_{3n}$), 860 ($v_{1n}$, $v_{5n}$). So if rotor 112 is in counter-clock direction and the crossing points 810 ($v_{1n}$, $v_{3n}$), 820 ($v_{3n}$, $v_{5n}$) have been detected, and then a crossing point of ($v_{1n}$, $v_{3n}$) is detected again, it can be determined that the rotation direction of rotor 112 has been changed to another direction, e.g., clockwise.

Processors or processor cores, as described herein, include central processing units (CPU's), microprocessors, microcontrollers (MCU), digital signal processors (DSP), application specific integrated circuits (ASIC), Field Programmable Gate Arrays (FPGA) and other programmable logics, state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processor may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

As known by one skilled in the art, a memory may comprise any combination of volatile and non-volatile computer-readable media for reading and writing. Volatile computer-readable media includes, for example, random access memory (RAM). Non-volatile computer-readable media includes, for example, any one or more of read only memory (ROM), magnetic media such as a hard-disk, an optical disk drive, a flash memory device, a CD-ROM, and the like. In some cases, a particular memory is separated virtually or physically into separate areas, such as a first memory, a second memory, a third memory, etc. In these cases, it is understood that the different divisions of memory may be in different devices or embodied in a single memory.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

The various examples described above can be combined to provide further examples. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the examples can be modified, if necessary to employ concepts of the various patents, applications and publications to provide yet further examples.

These and other changes can be made to the examples in light of the above-detailed description. In general, in the following claims, the terms used should not be construed to limit the claims to the specific examples disclosed in the specification and the claims, but should be construed to include all possible examples along with the full scope of equivalents to which such claims are entitled. Accordingly, the claims are not limited by the disclosure.

What is claimed is:

1. A method of operating a permanent magnet motor, comprising:
    determining an initial position of a rotor of the permanent magnet motor;
    providing an excitation current to windings of a stator of the permanent magnet motor based on the initial position of the rotor;
    detecting neutral voltages at a neutral point of the windings;
    determining a first time point when the rotor reaches a first 30n-degree angle and a second time point when the rotor reaches a second, later 30n-degree angle based on the detected neutral voltages and vectors of the excitation current;
    estimating a first speed of the rotor based on the first time point and the second time point; and
    controlling the excitation current based on the estimated first speed.

2. The method of claim 1, wherein the controlling the excitation current includes:
    estimating a dynamic position of the rotor based on the estimated speed; and
    determining the excitation current based on the estimated dynamic position of the rotor.

3. The method of claim 1, further comprising:
    determining a third time point when the rotor reaches a third 30n-degree angle later than the second 30n-degree angle based on the detected neutral voltages and the vectors of the excitation current; and
    estimating a second speed of the rotor based on the third time point and the second time point and based on the first speed.

4. The method of claim 3, wherein the estimating the second speed includes:
    estimating a preliminary value of the second speed based on an interval between the third time point and the second time point;
    determining a comparison time point of the rotor reaching the third 30n-degree angle using the first speed;
    determining a delta time by comparing the third time point and the comparison time point; and
    estimating the second speed based on the preliminary value of the second speed and the delta time.

5. The method of claim 3, wherein the estimating the second speed includes:
    estimating a preliminary value of the second speed based on an interval between the third time point and the second time point;
    determining a calibration value by comparing the preliminary value of the second speed with the first speed;
    determining a comparison time point of the rotor reaching the third 30n-degree angle using the first speed; and
    estimating the second speed based on the preliminary value of the second speed and the calibration value.

6. The method of claim 1, further comprising determining a rotation direction of the rotor based on vectors of the excitation current associated with a 30n-degree angle.

7. The method of claim 1, wherein determining a first time point when the rotor reaches a 30n-degree angle includes:
    identifying first, second and third vectors of the excitation current, the first, second and third vectors being 120 degree out-of-phase from one another;
    detecting the neutral voltages associated with the first, second and third vectors; and
    determining a crossing point of waveforms of the neutral voltages associated with two of the first, second and third vectors of the excitation current as the 30n-degree angle.

8. The method of claim 7, wherein the determining a crossing point of waveforms of the neutral voltage associated with the first vector and the second vector includes:
    detecting a first neutral voltage value and a second, later neutral voltage value associated with the first vector;
    detecting a third neutral voltage value and a fourth, later neutral voltage value associated with the second vector; and
    determining the crossing point of the waveforms of the neutral voltage associated with the first vector and the second vector based on one of:
        the first neutral voltage is larger than the third neutral voltage and the second neutral voltage is smaller than the fourth neutral voltage; or
        the first neutral voltage is smaller than the third neutral voltage and the second neutral voltage is larger than the fourth neutral voltage.

9. The method of claim 1, wherein the determining the initial position of the rotor of the permanent magnet motor includes:
    providing a calibration current to the windings of the stator, the calibration current being of a magnitude smaller than a threshold magnitude for driving the rotor;
    detecting neutral voltages associated with the calibration current;
    obtaining sinusoidal waveforms of the neutral voltages associated with three vectors of the calibration current, the three vectors being 120 degree out-of-phase from one another; and
    determining the initial position of the rotor based on the sinusoidal waveforms.

10. The method of claim 9, wherein the determining the initial position of the rotor includes performing a Clark transformation on the sinusoidal waveforms.

11. An integrated circuit, comprising:
   a processing core;
   an interfacing element;
   a memory storing executable instructions which, when executed by the processor core, configure the processor core to implement a motor control system including:
      a motor driving unit configured to cause a driving circuit to provide an excitation current to stator windings of a permanent magnet motor to drive a rotor of the permanent magnet motor;
      a neutral voltage receiving unit configured to receive data of neutral voltages detected at a neutral point of the stator windings;
      a 30n-degree angle determination unit configured to determine a first time point when the rotor reaches a first 30n-degree angle and a second time point when the rotor reaches a second, later 30n-degree angle based on the received data of the neutral voltages and vectors of the excitation current;
      a speed estimation unit configured to estimate a first speed of the rotor based on the first time point and the second time point; and
      a control unit configured to determine the excitation current based on the estimated first speed.

12. The integrated circuit of claim 11, wherein the speed estimation unit is further configured to estimate a second speed of the rotor based on a third time point when the rotor reaches a third 30n-degree angle later than the second 30n-degree angle and the second time point, and based on the first speed.

13. The integrated circuit of claim 12, further comprising a PLL unit, and wherein:
   the speed estimation unit estimates a preliminary value of the second speed based on an interval between the third time point and the second time point;
   the PLL unit determines the calibration value by comparing the preliminary value of the second speed and the first speed; and
   the speed estimation unit estimates the second speed based on the preliminary value of the second speed and the calibration value.

14. The integrated circuit of claim 11, wherein the 30n-degree angle determination unit is configured to:
   identify first, second and third vectors of the excitation current, the first, second and third vectors being 120 degree out-of-phase from one another;
   identify the neutral voltages associated with the first, second and third vectors; and
   determine a crossing point of waveforms of the neutral voltages associated with two of the first, second and third vectors of the excitation current as the 30n-degree angle.

15. The integrated circuit of claim 14, wherein the determining a crossing point of waveforms of the neutral voltage associated with the first vector and the second vector includes:
   detecting a first neutral voltage value and a second, later neutral voltage value associated with the first vector;
   detecting a third neutral voltage value and a fourth, later neutral voltage value associated with the second vector; and
   determining the crossing point of the waveforms of the neutral voltage associated with the first vector and the second vector based on one of:
      the first neutral voltage is larger than the third neutral voltage and the second neutral voltage is smaller than the fourth neutral voltage; or
      the first neutral voltage is smaller than the third neutral voltage and the second neutral voltage is larger than the fourth neutral voltage.

16. The integrated circuit of claim 11, further comprising an initial position determination unit configured to determine an initial position of the rotor of the permanent magnet motor, including:
   providing a calibration current to the windings of the stator, the calibration current being of a magnitude smaller than a threshold magnitude for driving the rotor;
   detecting neutral voltages associated with the calibration current;
   obtaining sinusoidal waveforms of the neutral voltages associated with three vectors of the calibration current, the three vectors being 120 degree out-of-phase from one another; and
   determining the initial position of the rotor based on the sinusoidal waveforms.

17. The integrated circuit of claim 16, wherein the determining the initial position of the rotor includes performing a Clark transformation on the sinusoidal waveforms.

18. A system, comprising:
   a motor including a stator and a rotor, the stator including multiple windings and a neutral point, and the rotor including at least two permanent magnets arranged as two magnetic poles;
   a driving circuitry coupled to the multiple windings of the stator;
   a voltage detection circuitry coupled to the neutral point; and
   a controller configured to:
      control the driving circuitry to provide an excitation current to the multiple windings to drive the rotor;
      receive from the voltage detection circuitry neutral voltages detected at the neutral point;
      determine a first time point when the rotor reaches a first 30n-degree angle and a second time point when the rotor reaches a second, later 30n-degree angle based on the received neutral voltages and associated vectors of the excitation current;
      estimate a first speed of the rotor based on the first time point and the second time point; and
      determine the excitation current based on the estimated first speed.

19. The system of claim 18, wherein the driving circuitry includes a three-phase inverter circuit.

20. The system of claim 18, wherein the voltage detection circuitry includes a voltage divider circuit electrically coupled to the neutral point.

* * * * *